(12) United States Patent
Suzuki et al.

(10) Patent No.: US 9,391,887 B2
(45) Date of Patent: Jul. 12, 2016

(54) MAPPING SERVER, NETWORK SYSTEM, PACKET FORWARDING METHOD AND PROGRAM

(75) Inventors: Kazuya Suzuki, Tokyo (JP); Masahiro Jibiki, Tokyo (JP)

(73) Assignee: NEC Corporation, Tokyo (JP)

( * ) Notice: Subject to any disclaimer, the term of this patent is extended or adjusted under 35 U.S.C. 154(b) by 113 days.

(21) Appl. No.: 13/996,517

(22) PCT Filed: Aug. 29, 2011

(86) PCT No.: PCT/JP2011/004785
§ 371 (c)(1),
(2), (4) Date: Jun. 20, 2013

(87) PCT Pub. No.: WO2012/090351
PCT Pub. Date: Jul. 5, 2012

(65) Prior Publication Data
US 2013/0272310 A1    Oct. 17, 2013

(30) Foreign Application Priority Data

Dec. 27, 2010  (JP) .................................. 2010-290038
May 25, 2011  (JP) .................................. 2011-117121

(51) Int. Cl.
*H04L 12/721*  (2013.01)
*H04L 12/715*  (2013.01)
*H04L 12/717*  (2013.01)

(52) U.S. Cl.
CPC ................. *H04L 45/72* (2013.01); *H04L 45/04* (2013.01); *H04L 45/42* (2013.01)

(58) Field of Classification Search
CPC ......... H04L 45/72; H04L 45/04; H04L 45/42; H04L 12/56

USPC .................................................. 370/389–392
See application file for complete search history.

(56) References Cited

U.S. PATENT DOCUMENTS

| | | | | |
|---|---|---|---|---|
| 9,083,609 | B2* | 7/2015 | Casado | H04L 41/06 |
| 2006/0165003 | A1* | 7/2006 | Partridge | H04L 43/10 |
| | | | | 370/248 |
| 2007/0013547 | A1* | 1/2007 | Boaz | G01D 4/002 |
| | | | | 340/870.02 |
| 2010/0077230 | A1* | 3/2010 | Chambers | G06F 12/1408 |
| | | | | 713/193 |
| 2010/0316054 | A1* | 12/2010 | Xu | H04L 12/4633 |
| | | | | 370/392 |
| 2011/0131470 | A1* | 6/2011 | Kambayashi | G06F 21/79 |
| | | | | 714/763 |

FOREIGN PATENT DOCUMENTS

| | | |
|---|---|---|
| JP | 2005-318409 A | 11/2005 |
| JP | 2005318409 A * | 11/2005 |
| JP | 2008-263436 A | 10/2008 |

OTHER PUBLICATIONS

OpenFlow Switch Speci_cationVersion 1.0.0 ( Wire Protocol 0x01 )Dec. 31, 2009.*

(Continued)

*Primary Examiner* — Charles C Jiang
*Assistant Examiner* — Kyaw Z Soe
(74) *Attorney, Agent, or Firm* — McGinn IP Law Group, PLLC

(57) ABSTRACT

A mapping server includes: a path information obtaining unit that obtains path information on external networks through a forwarding device connected to an external network; and a mapping information generating unit that generates mapping information that relates the path information and the forwarding device.

14 Claims, 23 Drawing Sheets

(56) References Cited

OTHER PUBLICATIONS

International Search Report dated Sep. 20, 2011 in PCT/JP2011/004785, with English translation thereof.
Y. Rekhter, T. Li and S. Hares, "A Border Gateway Protocol 4 (BGP-4)," RFC 4271, Internet Engineering Task Force, 2006.
Nick McKeown et al. "OpenFlow: Enabling Innovation in Campus Networks"Mar. 14, 2008, [online], [Searched on May 25, 2011], Internet <URL: http://www.openflowswitch.org//documents/openflow-wp-latest.pdf>.

"OpenFlow Switch Specification version 1.1.0 (Wire Protocol 0x02)," Feb. 28, 2011, [Searched on May 25, 2011], Internet <URL:http://www.openflowswitch.org/documents/openflow-spec-v1.1.0.pdf>.

* cited by examiner

FIG. 3

ROUTE TABLE 122

| DESTINATION ADDRESS | PREFIX LENGTH | NEXT-HOP ADDRESS | INTERFACE |
|---|---|---|---|
| 192.168.1.0 | 24 | 172.16.1.254 | if21 |
| 192.168.10.0 | 23 | 172.16.5.1 | if25 |
| 192.168.12.0 | 23 | 172.16.1.254 | if21 |
| ... | ... | ... | ... |

FIG. 5

MAPPING CORRESPONDENCE TABLE 142

| ID | PREFIX LENGTH | LOCATOR ADDRESS |
|---|---|---|
| 192.168.1.0 | 24 | 172.16.1.254 |
| 192.168.10.0 | 23 | 172.16.5.1 |
| 192.168.10.0 | 24 | 172.16.1.2 |
| ⋮ | ⋮ | ⋮ |

FIG. 9

| Withdrawn Routes Length (two octets) | Withdrawn Routes (variable) | Total Path Attribute Length (two octets) | Path Attributes (variable) | Network Layer Reachability Information (variable) |
|---|---|---|---|---|

FIG. 10 m1: PREFIX/PREFIX LENGTH: 192.168.1.0/24 | AS_PATH ATTRIBUTE: { 4, 3, 1 } m2: PREFIX/PREFIX LENGTH: 192.168.1.0/24 | AS_PATH ATTRIBUTE: { 4, 3, 1 } | NEXTHOP ATTRIBUTE: 172.16.1.254

FIG. 11

| BGP ID | LOCATOR ADDRESS |
|---|---|
| 192.168.1.1 | 172.16.1.254 |
| 192.168.1.2 | 172.16.5.1 |
| 192.168.1.3 | 172.16.1.2 |
| ⋮ | ⋮ |

FIG. 13      MAPPING CORRESPONDENCE TABLE 143

| ID | PREFIX LENGTH | LOCATOR ADDRESS | PRIORITY VALUE |
|---|---|---|---|
| 192.168.1.0 | 24 | 172.16.1.254 | 100 |
| 192.168.10.0 | 24 | 172.16.5.1 | 50 |
| 192.168.10.0 | 24 | 172.16.1.2 | 25 |
| ... | ... | ... | |

FIG. 14 m3

| PREFIX/<br>PREFIX LENGTH | AS_PATH ATTRIBUTE | NEXTHOP ATTRIBUTE |
|---|---|---|
| 192.168.10.0/24 | { 4, 3 } | 172.16.5.1 | m4

| PREFIX/<br>PREFIX LENGTH | AS_PATH ATTRIBUTE | NEXTHOP ATTRIBUTE |
|---|---|---|
| 192.168.10.0/24 | { 10, 2, 4, 3 } | 172.16.1.2 |

FIG. 19

| MAC DA | | | | |
|---|---|---|---|---|
| MAC DA | | | | |
| MAC SA | | | | |
| MAC SA | | TPID(81-00) | | TYPE |
| VLAN ID | | ToS | | Total Length |
| Ver/IHL | | | | |
| Identification | | | | Flag/Flag Offset |
| TTL | | Protocol | | Checksum |
| IP SA | | | | |
| IP DA | | | | |
| Source Port | | | | Destination Port |
| Sequence Number | | | | |
| Acknowledgement Number | | | | |
| Offset / Flags | | | | Window Size |
| Checksum | | | | Urgent Pointer |
| Payload Data | | | | |

FIG. 20

| ACTION | CONTENT |
|---|---|
| OUTPUT | OUTPUT TO SPECIFIED PORT |
| SET_VLAN_VID | SET VLAN ID |
| SET_VLAN_PCP | SET VLAN PRIORITY |
| SET_DL_SRC | SET ETHERNET SOURCE ADDRESS |
| SET_DL_DST | SET ETHERNET DESTINATION ADDRESS |
| SET_NW_SRC | SET IP SOURCE ADDRESS |
| SET_NW_DST | SET IP DESTINATION ADDRESS |
| SET_TP_SRC | SET TCP/UDP SOURCE PORT NUMBER |
| SET_TP_DST | SET TCP/UDP DESTINATION PORT NUMBER |
| VENDOR | VENDOR-DEFINED ACTION |

FIG. 21

| VIRTUAL PORT | MEANING |
|---|---|
| IN_PORT | TRANSMISION OF PACKET FROM THE INPUT PORT |
| NORMAL | PROCESS THE PACKET USING TRADITIONAL NON-OPENFLOW PIPELINE OF THE SWITCH |
| FLOOD | TRANSMISSION OF PACKET ALL PHYSICAL PORTS IN A FORWARDING STATE EXCEPT THE INPUT PORT |
| ALL | TRANSMISSION OF PACKET ALL STANDARD PORTS EXCEPT THE INPUT PORT |
| CONTROLLER | TRANSMISSION OF PACKET TO CONTROLLER THROUGH SECURE CHANNEL |
| LOCAL | TRANSMISSION OF PACKET TO THE SWITCH'S LOCAL NETWORKING STACK |

# MAPPING SERVER, NETWORK SYSTEM, PACKET FORWARDING METHOD AND PROGRAM

CROSS-REFERENCE TO RELATED APPLICATIONS

The present application claims priorities from Japanese Patent Application 2010-290038 (filed on Dec. 27, 2010) and Japanese Patent Application 2011-117121 (filed on May 25, 2011), the contents of which are hereby incorporated in their entirety by reference thereto. The present invention relates to a mapping server, a network system, a packet forwarding method and a program, and more particularly to a network system with a router performing an inter-domain packet forwarding, and a mapping server, a packet forwarding method and a program in such a system.

TECHNICAL FIELD

Background

The Internet comprises mutually connected networks, each managed by one of a plurality of organizations. A network managed by each organization is called an autonomous system (AS). Path information for an address block allocated to each AS is exchanged between Autonomous systems (ASs) using a path control protocol described in Non Patent Literature (NPL) 1, he Border Gateway Protocol (BGP). In general, each AS includes a plurality of routers. It is necessary for all routes in each AS to share the path information received from other AS. It is necessary for all routes in each AS to share the path information received from other AS.

FIG. 16 is a diagram illustrating, as an example, an internal network connected to an external network. In the network shown in FIG. 16, for example, when the router R21 receives path information from an external network N1, the router R21 needs to inform the routers R22 to R26 of the path information. Note that a BGP used in exchanging information among routers within an AS is called an internal BGP (iBGP), and a BGP used in exchanging information with router(s) outside of the AS (i.e. among routers included in different Autonomous systems (ASs)) is called an external BGP (eBGP).

CITATION LIST

Non Patent Literature

NPL 1:
Y. Rekhter, T. Li and S. Hares, "A Border Gateway Protocol 4 (BGP-4)," RFC 4271, Internet Engineering Task Force, 2006.
NPL 2:
Nick McKeown et al., "OpenFlow: Enabling Innovation in Campus Networks," Mar. 14, 2008, [online], [Searched on May 25, 2011], Internet <URL: http://www.openflowswitch.org//documents/openflow-wp-latest.pdf>
NPL 3:
"OpenFlow Switch Specification version 1.1.0 (Wire Protocol 0x02)," Feb. 28, 2011, [Searched on May 25, 2011], Internet <URL:http://www.openflowswitch.org/documents/openflow-spec-v1.1.0.pdf>

SUMMARY

The disclosures of the above Non Patent Literatures 1 to 3 are hereby incorporated herein in their entirety by reference thereto. The following analysis has been made by the inventor of the present invention.

With the expansion of the Internet, the number of path information items for inter-domain routing is increasing year by year. According to the present inter-domain routing, all routers within an AS need to store all path information items received from external ASs. Therefore, in a case where the internal router cannot store the increased path information, it is necessary to increase the memory capacity of the internal router or replace the internal router with a more high-performance router.

Therefore, there is a need in the art to realize an inter-domain packet forwarding without having each of routers within an AS to store an external path.

SOLUTION TO PROBLEM

According to a first aspect of the present invention, there is provided a mapping server, comprising: a path information obtaining unit that obtains, through a router within an autonomous system (AS), path information of another AS; and a mapping information generating unit that generates a mapping information item relating (associated with) the path information and an address of the router.

According to a second aspect of the present invention, there is provided a packet forwarding method, comprising: by a mapping server, obtaining, through a router within an autonomous system (AS), path information of another AS; and by the mapping server, generating a mapping information item that relates (associated with) the path information and an address of the router.

According to a third aspect of the present invention, there is provided a program causing a computer to execute: obtaining, through a router within an autonomous system (AS), path information of another AS; and generating a mapping information item that relates the path information and an address of the router.

According to a fourth aspect of the present invention, there is provided a packet forwarding method comprising: obtaining, by a mapping server, path information on an external network through a forwarding device connected to the external network; and generating, by the mapping server, mapping information that relates the path information and identification information of the forwarding device.

According to a fifth aspect of the present invention, there is provided a mapping server comprising: a path information obtaining unit that obtains path information on an external network through a forwarding device connected to the external network; and a mapping information generating unit that generates mapping information that relates the path information and identification information of the forwarding device.

The present invention provides the following advantage, but not restricted thereto. A mapping server, a packet forwarding method, and a program according to the present invention realize an inter-domain packet forwarding without having each of routers within an AS to store an external path.

BRIEF DESCRIPTION OF THE DRAWINGS

FIG. 3 is a diagram illustrating a route table stored in a general router.
FIG. 5 is a diagram illustrating a mapping correspondence table in the first exemplary embodiment.

FIG. 9 is a diagram illustrating a structure of each field in an UPDATE message of a BGP message.

FIG. 10 is a diagram illustrating schematically a PATH attribute of a BGP message.

FIG. 11 a diagram illustrating a correspondence table between BGP IDs and locator addresses in the first exemplary embodiment.

FIG. 13 is a diagram illustrating a mapping correspondence table in a second exemplary embodiment.

FIG. 14 is a diagram illustrating schematically a PATH attribute in the BGP message employed to explain the second exemplary embodiment.

FIG. 19 is a diagram illustrating a header of an Ethernet/IP/TCP packet.

FIG. 20 is a diagram illustrating actions specifiable in an OpenFlow flow table and their descriptions.

FIG. 21 is a diagram illustrating virtual ports specifiable as a transfer destination in an OpenFlow action and their descriptions.

PREFERRED MODES

Figure 1:
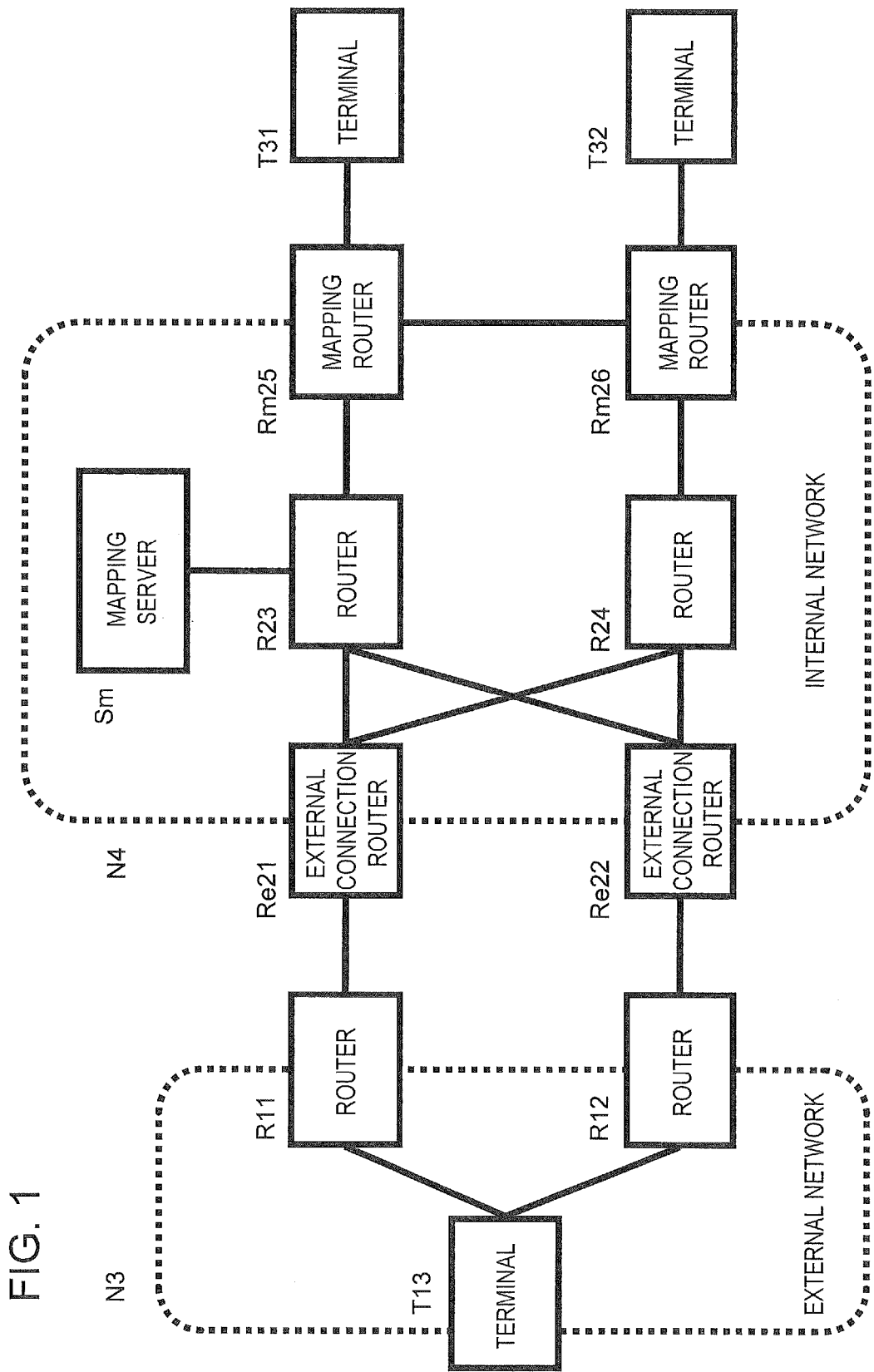
FIG. 1 is a diagram illustrating an internal network in a first exemplary embodiment.

In the present disclosure, there are various possible modes, which include the following, but not restricted thereto. First, the following describes an overview of the present invention. The reference numerals of the figures added to the overview are added to the elements for convenience sake to help understanding the description. Note that the present invention is not limited to the mode shown in the figures.

In the present invention, it is possible for each router in an internal network to perform packet forwarding towards an appropriate external address without having external path information. In the present invention, encapsulation of a packet is performed by a router disposed at an edge of the internal network perform. An address within the internal network is designated as a destination address of the encapsulated packet. In this way, inter-domain packet forwarding is realized without having each router in the internal network to store external path information.

In the above described case, it is necessary to select an appropriate address as a destination address of the encapsulated packet. FIG. 1 is a diagram illustrating, as an example, an internal network (N4) in an exemplary embodiment of the present invention. With reference to FIG. 1, for example, in a case where a terminal (T31) transmits a packet to a terminal (T13) connected to an external network (N3), a mapping router (Rm25) encapsulates a packet received from the terminal (T31). It is necessary for the mapping router (Rm25) to select either the external connection router (Re21) or the external connection router (Re22) as a destination of the encapsulated packet. In this case, it is necessary to make it possible to search for an address of a router disposed at an exit of the internal network (N4) in accordance with the external destination address. Information that relates an external destination address and an address of a router disposed at an exit of the internal network (N4) is called mapping information. The mapping information is stored in a database disposed at the mapping server (Sm) in FIG. 1. The mapping router (Rm25), upon receiving a packet, determines an address to be added in the encapsulation by inquiring the mapping server (Sm). The external connection routers (Re21, Re22) transmit path information received through eBGP to the mapping server (Sm). The mapping server (Sm) generates mapping information based on the path information received via eBGP and addresses of the source of the path information, i.e., addresses of the external routers (Re21, Re22), and stores the mapping information in its own database.

The following modes are provided in the present invention.

(Mode 1)
There is provided a mapping server according to the above first aspect of the present invention.

(Mode 2)
In the mapping server, the mapping information generating unit may calculate a priority value based on the path information and assign the priority value to the mapping information item.

(Mode 3)
There is provided a network system comprising:
the above mapping server; and
a router that, when receiving a packet whose destination address is on another AS, searches for an address of a router that corresponds to the destination address based on the mapping information item, encapsulates the received packet, and forwards the encapsulated packet to the searched address.

(Mode 4)
In the network system, the router may select an address of a router that corresponds to the destination address in accordance with the priority value assigned to each of the mapping information items.

(Mode 5)
There is provided a packet forwarding method according to the above second aspect of the present invention.

(Mode 6)
The packet forwarding method may comprise calculating a priority value based on the path information and assigning the priority value to the mapping information item.

(Mode 7)
The packet forwarding method may comprise:
by a router, when receiving a packet whose destination address is on another AS, searching for an address of a router that corresponds to the destination address based on the mapping information item; and encapsulating the received packet, and forwarding the encapsulated packet to the searched address.

(Mode 8)
The packet forwarding method may comprise, by the router, selecting an address of a router that corresponds to the destination address in accordance with the priority value assigned to each of the mapping information items.

(Mode 9)
There is provided a program according to the above third aspect of the present invention.
(Mode 10)
There is provided a mapping server comprising:
a path information obtaining unit that obtains path information using
a path control protocol; and
a mapping information generating unit that generates a mapping information item based on the path information.
(Mode 11)
There is provided a network system, comprising:
a mapping server that comprises a mapping information generating unit; and
a router that comprises a routing processing unit and a tunnel processing unit, wherein
the mapping information generating unit generates a mapping information item based on path information,
the routing processing unit searches for a locator address that corresponds to a destination address of a received packet based on the mapping information, and
the tunnel processing unit encapsulates the received packet and sets the destination address of the encapsulated packet to the locator address obtained in the search.
(Mode 12)
There is provided a packet forwarding method, comprising:
generating a mapping information item based on path information; searching for a locator address that corresponds to a destination address of a received packet based on the mapping information item; and
encapsulating the received packet and setting the destination address of the encapsulated packet to the locator address obtained in the searching.
(Mode 13)
The packet forwarding method may comprise obtaining the path information using a path control protocol.
(Mode 14)
In the packet forwarding method, the generating mapping information item may comprise determining a locator address in the mapping information based on information regarding a router that transmits the path information in the obtaining the path information.
(Mode 15)
In the packet forwarding method, the information regarding a router may be an address of the router.
(Mode 16)
In the packet forwarding method, the information regarding a router may be an identifier that identifies the router.
(Mode 17)
In the packet forwarding method, the generating mapping information item may comprise determining a locator address in the mapping information based on information indicative of a next hop within the path information.
(Mode 18)
In the path forwarding method, the generating mapping information may comprise calculating based on the path information a priority value assigned to each of the mapping information items.
(Mode 19)
In the packet forwarding method, the encapsulating may comprise selecting a locator address based on the priority valued assigned to each of the mapping information items.

In the present disclosure, there are also provided the following modes.
(Mode 20)
There is provided a packet forwarding method according to the above fourth aspect of the present invention.

(Mode 21)
The packet forwarding method may further comprise, by the mapping server, calculating a priority value based on the path information and assigning the priority value to the mapping information item.
(Mode 22)
In the packet forwarding method, the identification information of the forwarding device may be an address of the forwarding device, and
the method may further comprise:
by a first forwarding device, searching for an address of a second forwarding device that corresponds to a destination address of a packet received by the first forwarding device, based on the mapping information item; and
by the first forwarding device, encapsulating the received packet and sending the encapsulated packet to the address of the second forwarding device.
(Mode 23)
The packet forwarding method may comprise:
by a control device, searching for identification information of a second forwarding device that corresponds to a destination address of a received packet based on the mapping information item;
by the control device, calculating a path from a first forwarding device to the second forwarding device; and
by the first forwarding device, forwarding along the calculated path a packet with the same destination address as the received packet.
(Mode 24)
The packet forwarding method according to claim 3, wherein the searching for an address of a second forwarding device by the first forwarding device or the searching for identification information of a second forwarding device by the control device may comprise selecting a mapping information item from among a plurality of the mapping information items with a same destination prefix based on the priority value assigned to each of the plurality of mapping information items.
(Mode 25)
In the packet forwarding method, the selecting of a mapping information may comprise selecting a mapping information item in proportion to the priority value assigned to each of the plurality of mapping information items.
(Mode 26)
The packet forwarding method may comprise calculating a hash value using information included in a header of a received packet, wherein the selecting a mapping information may comprise using the hash value.
(Mode 27)
There is provided a mapping server according to the above fifth aspect of the present invention.
(Mode 28)
In the mapping server, the mapping information generating unit may calculate a priority based on the path information and assigns the priority to the mapping information item.
(Mode 29)
In a network system, the identification information of the forwarding device may be an address of the forwarding device, and
the network system may comprise:
the above mapping server; and
a first forwarding device that searches for an address of a second forwarding device, corresponding to a destination address of a received packet, based on the mapping information item, encapsulates the received packet, and sends the encapsulated packet to the address of the second forwarding device.

(Mode 30)
In the network system, the first forwarding device, when searching an address of the second forwarding device, may select a mapping information item from among a plurality of the mapping information items with a same destination prefix based on the priority value assigned to each of the plurality of the mapping information items.
(Mode 31)
In the network system, the first forwarding device may select a mapping information item in proportion to the priority value assigned to each of the plurality of mapping information items.
(Mode 32)
In the network system, the first forwarding device may calculate a hash value using information included in a received packet and select using the hash value a mapping information item from among the plurality of the mapping information items with a same destination prefix.
(Mode 33)
A network system may comprise:
the above mapping server;
a control device that searches, based on the mapping information item, for identification information of a second forwarding device corresponding to a destination address of a packet received by a first forwarding device, and calculates a path from the first forwarding device to the second forwarding device; and
a forwarding device that forwards along the calculated path a packet with the same destination address as the received packet.
(Mode 34)
In the network system, the control device, when searching identification information of the second forwarding device, may select a mapping information item from among a plurality of the mapping information items with a same destination prefix based on a priority value assigned to each of the plurality of mapping information items.
(Mode 35)
In the network system, the control device may select a mapping information item in proportion to the priority value assigned to each of the plurality of mapping information items.
(Mode 36)
In the network system, the control device may calculate a hash value using information included in a received packet, and select using the hash value a mapping information item from among the plurality of the mapping information items with a same destination prefix.

First Exemplary Embodiment

A network system according to a first exemplary embodiment is described with reference to the drawings.

Figure 2:
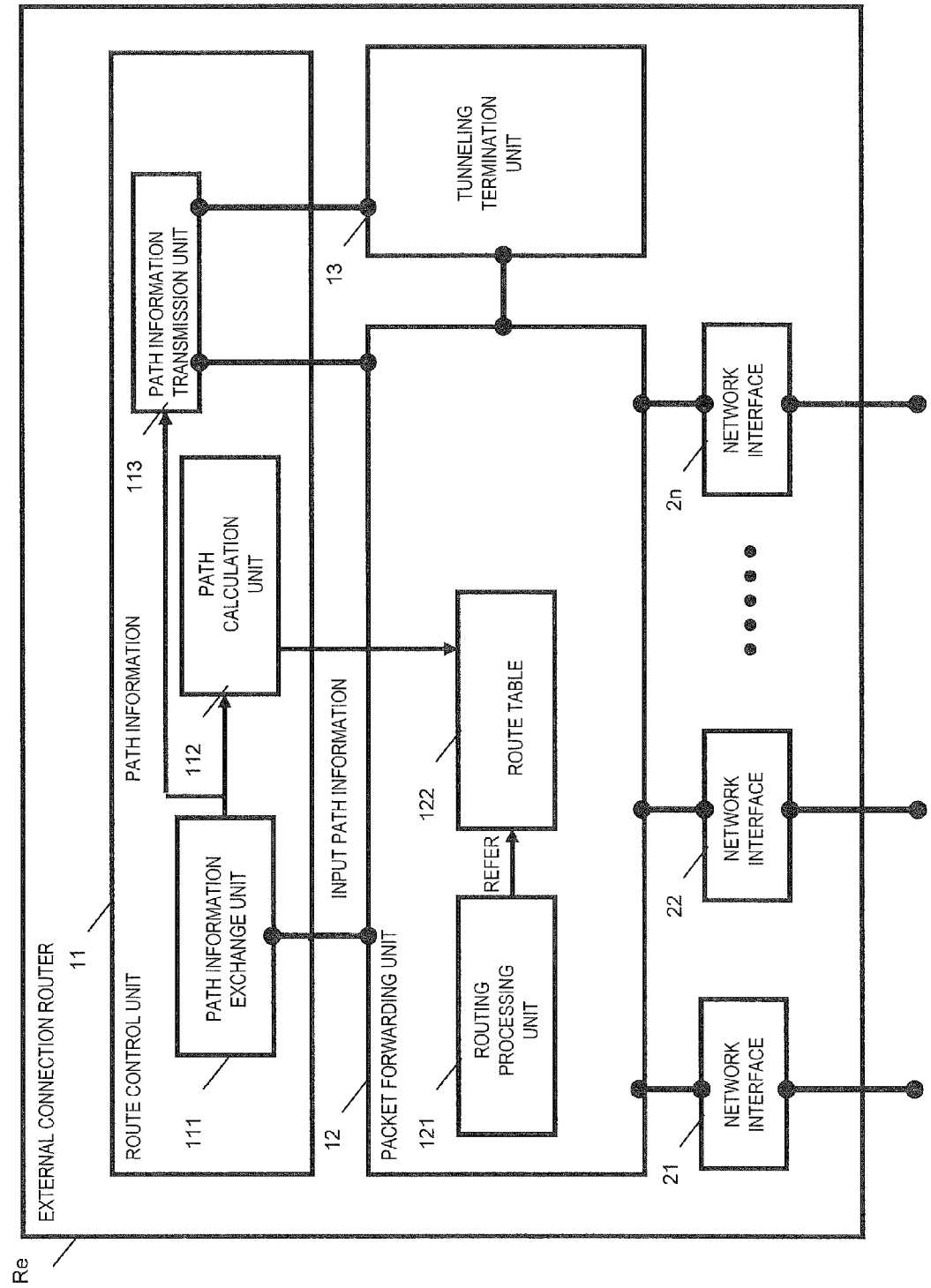
FIG. 2 is a block diagram illustrating a structure of an external connection router in the first exemplar embodiment.

FIG. 2 is a block diagram illustrating as an example a structure of an external connection router Re in the present exemplary embodiment. Hereinafter, the external connection routers Re21 and Re22 in FIG. 1 are collectively called as an external connection router Re. With reference to FIG. 2, the external connection router Re comprises a route control unit 11, a packet forwarding unit 12, a tunneling termination unit 13 and network interfaces 21-2n.

The control unit 11 comprises a path information exchange unit 111, path calculation unit 112, and a path information transmission unit 113. The path information exchange unit 111 exchanges path information among neighboring routes using a path control protocol such as BGP etc. The path information exchange unit 111 sends the collected path information to the path calculation unit 112 and the path information transmission unit 113. The path calculation unit 112 performs a path calculation defined in each path control protocol in use, and registers the path information in the route table 122. The path information transmission unit 113 informs the mapping server of the path information received from the path information exchange unit 111.

The packet forwarding unit 12 comprises routing processing unit 121 and a route table 122. FIG. 3 illustrates as an example a structure of the route table 122. With reference to FIG. 3, the route table 122 is a table storing path information items, each comprises an destination, a prefix length, a next hop, and an interface. While FIG. 3 illustrates an example in a case of IPv4, the route table 122 in a case of IPv6 is a table with similar entries. The routing processing unit 121 refers to an destination address field included in the header part of a packet received from each of the network interfaces 21-2n, and searches for a next-hop address and an interface using the route table 122. The routing processing unit 121 transmits the received packet through the searched interface to a router having the searched next-hop address.

The tunneling termination unit 13 decapsulates the encapsulated packet and sends the decapsulated packet to the packet forwarding unit 12 when the destination of the packet is an address of the external connection router Re.

Figure 4:
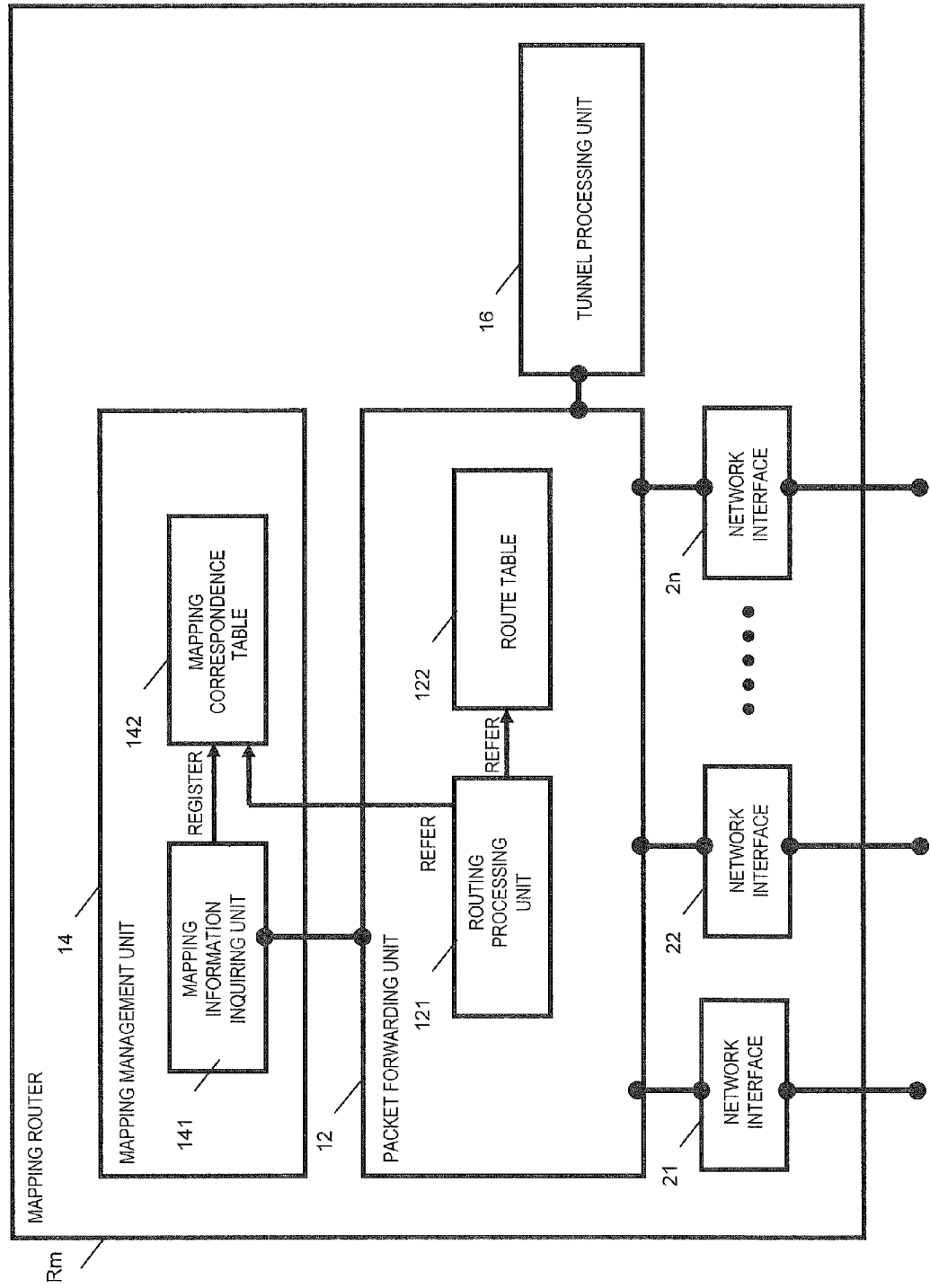
FIG. 4 is a block diagram illustrating a structure of a mapping router in the first exemplary embodiment.

FIG. 4 is a block diagram illustrating a structure of a mapping router Rm. Hereinafter, the mapping routers Rm25 and Rm26 in FIG. 1 are collectively called as a mapping router Rm. With reference to FIG. 4, the mapping router Rm in the present exemplary embodiment comprises a mapping management unit 14, a packet forwarding unit 12, a tunnel processing unit 16, and network interfaces 21-2n.

An operation of each unit is the same as that of each unit of the external connection router Re in FIG. 2, except for the tunneling processing unit 16, the mapping management unit 14 and the routing processing unit 121. The routing processing unit 121, when a received packet is to be mapped, sets the destination of the packet as an ID, searches for the corresponding locator address from the mapping correspondence table 142, and orders the tunneling processing unit 16 to transmit the packet through the tunnel to the searched locator address. In a case where a received packet is not a target to be mapped, the routing processing unit 121 performs ordinary packet forwarding processing.

The mapping management unit 14 comprises a mapping information inquiring unit 141 and a mapping correspondence table 142. The mapping correspondence table 142 is a table that stores and manages set of an ID address and a locator address.

FIG. 5 is a diagram illustrating as an example a mapping correspondence table 142. With reference to FIG. 5, the mapping correspondence table 142 stores a plurality of mapping information items, each of which comprises an ID, a prefix length, and a locator address. For example, a destination address 192.168.1.1, when masked by 24 bit mask, matches the first entry of the mapping correspondence table 142 in FIG. 5. In this case, the locator address is given by 172.16.1.254. A destination address 192.168.10.1 matches both the second and third entries of mapping correspondence table 142 in FIG. 5. In this case, the third entry with the longest prefix length is adopted and the locater address is given by 172.16.1.2. As described above, the process of searching by setting the destination address as an ID is similar to the process of address searching based on longest prefix match (LPM) search in a path table of Internet protocol (IP).

The mapping information inquiring unit 141 inquires the mapping server Sm about mapping information when there is no entry in the mapping correspondence table 142 that matches the search performed by the routing processing unit 121.

The tunneling processing unit 16 encapsulated the packet towards a specified locator address and sends the encapsulated packet to the packet forwarding unit 12.

Figure 6:
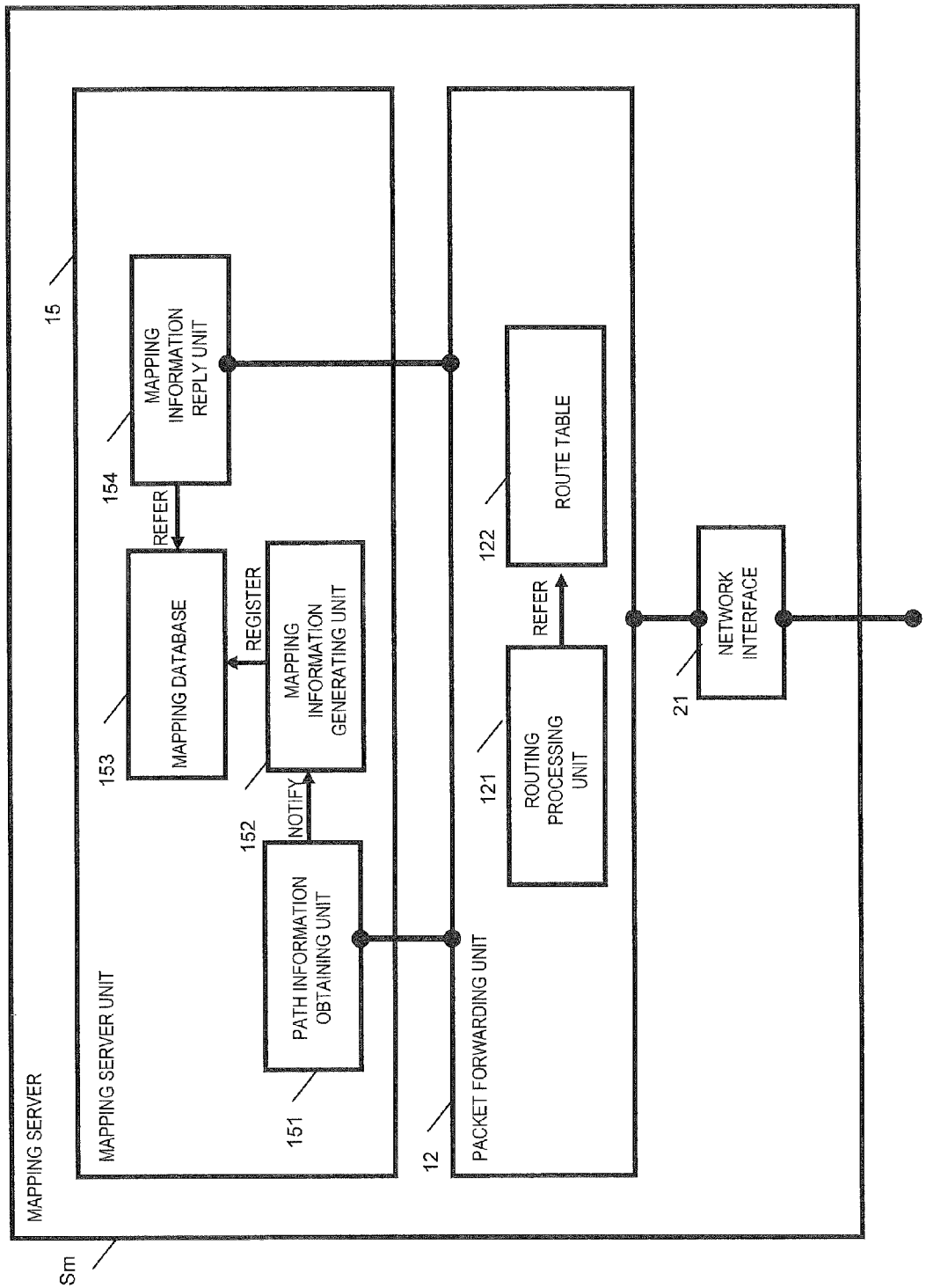
FIG. 6 is a block diagram illustrating a structure of a mapping server in the first exemplary embodiment.

FIG. 6 is a block diagram illustrating a structure of a mapping server Sm in the present exemplary embodiment. With reference to FIG. 6, the mapping server Sm comprises a mapping server unit 15, a packet forwarding unit 12, and a network interface 21.

An operation of each unit, except the mapping server unit 15, is the same as that of each unit of the external connection router Re. The mapping server unit 15 comprises a path information obtaining unit 151, a mapping information generating unit 152, a mapping database 153, and a mapping information reply unit 154.

The path information obtaining unit 151 receives path information sent from the path information transmission unit 113 in the external connection router Re and sends the path information to the mapping information generating unit 152. The mapping information generating unit 152 generates mapping information based on the path information sent from the path information obtaining unit 151 and register the mapping information in the mapping database 153. The mapping database 153 stores the mapping information generated by the mapping information generating unit 152. Information stored in the mapping database 153 is managed as a table equivalent to the mapping correspondence table 142. The mapping information replay unit 154, upon receiving an inquiry from the mapping information inquiring unit 141 of the mapping router Rm in FIG. 4, searches for a corresponding entry in the mapping database 153 and replies the entry. In this case, searching processing in the mapping database 153 is equivalent to searching processing in the mapping correspondence table 142 by the mapping router Rm.

Figure 7:
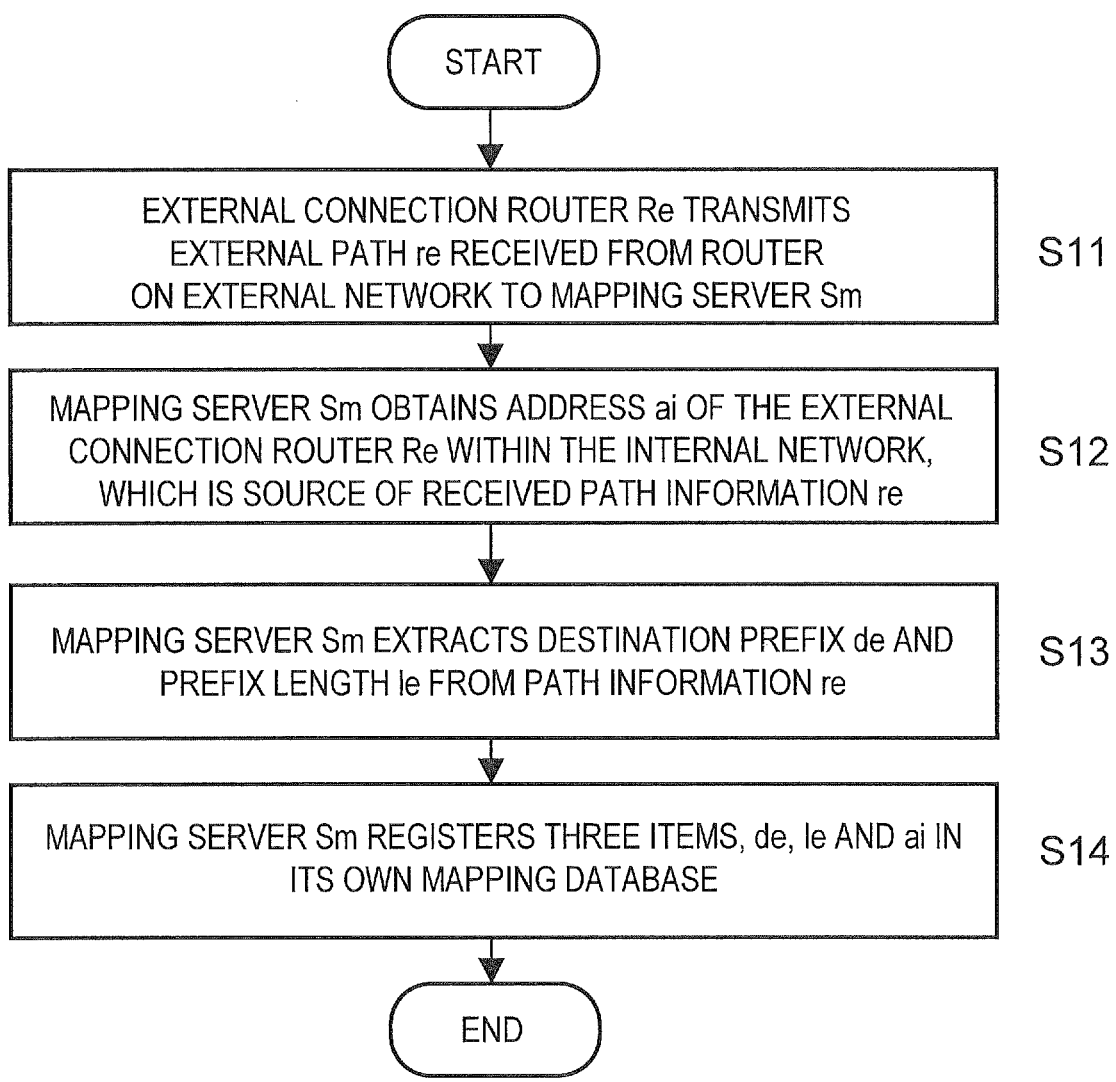
FIG. 7 is a flow chart illustrating a registration procedure by the mapping sever in the first exemplary embodiment.

FIG. 7 is a flow chart illustrating a registration procedure of mapping information in the present exemplary embodiment. First, the external connection router Re obtains path information re from a router on an external network using a path control protocol. The external connection router Re transmits the obtained path information to the mapping server Sm (step S11).

Next, the mapping server Sm obtains an address ai of an interface, connected to the internal network, of the external connection router Re which is the source of the received path information re (step S12).

Details of how to obtain the address ai will be described later on. Next, the mapping server Sm extracts a destination prefix de and a prefix length le from the path information re (step S13).

Next, the mapping server Sm registers se of three items, de, le and ai in its own mapping database 153. In this case, de is stored as an ID, le is stored as a prefix length, and ai is stored in the field of locater address (step S14). If an item with the same de and le is already stored in the database 153, an item with a higher priority value is selected according to selection criteria in the original path control protocol and store in the database 153.

Figure 8:
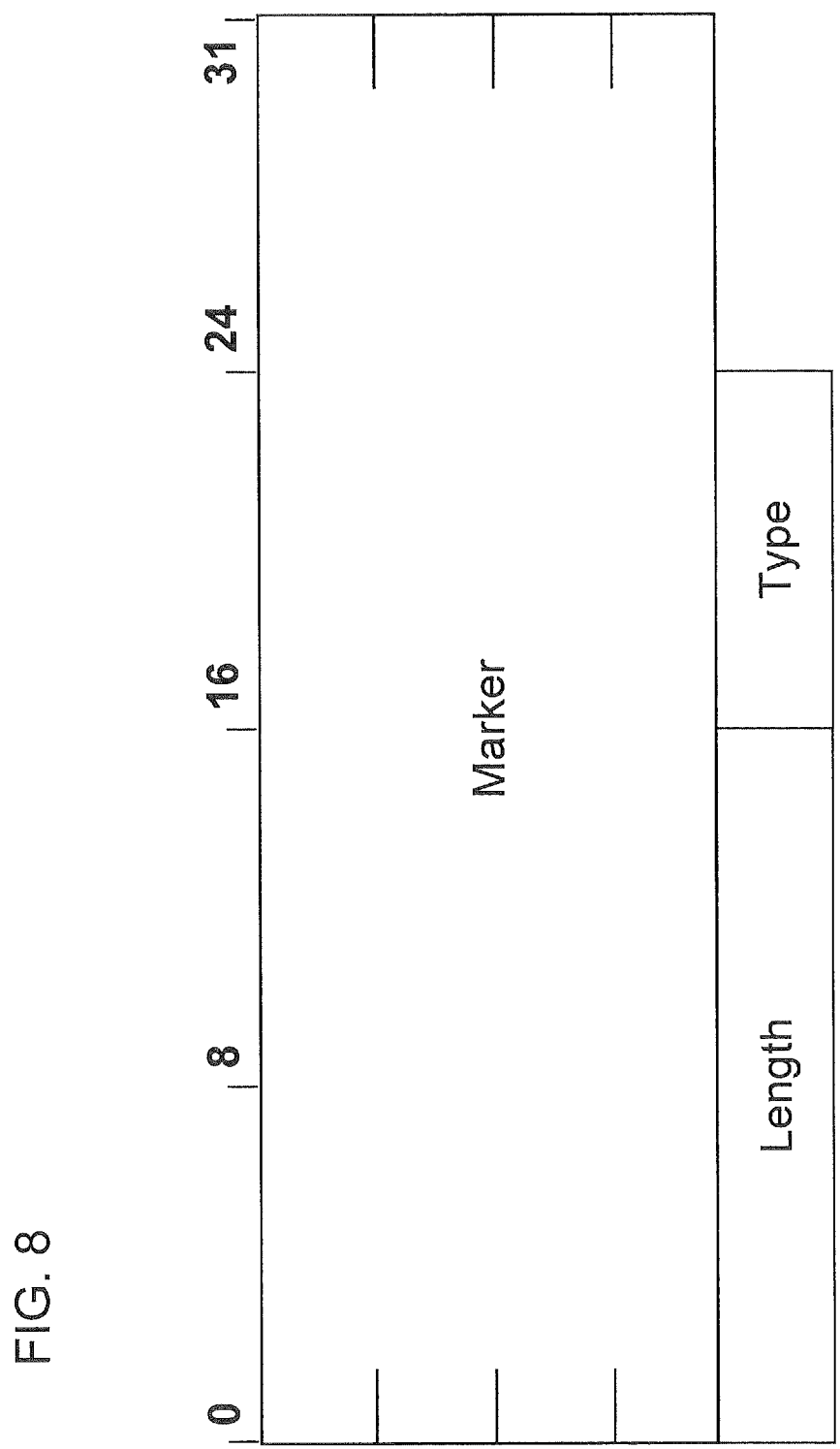
FIG. 8 is a diagram illustrating a structure of each field in a BGP header of a BGP message.

FIG. 8 illustrates a header of a BGP (as a path control protocol) message. Marker in FIG. 8 is a field used for detection of synchronization in the BGP message or for authentication. Length is a field indicating length of the BGP message including the header. Type is a field indicating a type of the BGP message. In a case where the value of the type field is two, the field following the BGP header is a BGP UPDATE message.

FIG. 9 illustrated a BGP UPDATE message. Each router uses this UPDATE message when it transmits path information stored in it or path information received from a router to another router. Withdrawn Rotes Length is a field with two octets and represents the length of the following Withdrawn Routes field. Withdrawn Routes is a variable-length field and used to inform an unreachable path. Total Path Attribute is a field with two octets and represents the length of the following Path Attributes field. Path Attribute field is used to inform various PATH attributes. These various PATH attributes includes AS_PATH attribute, Next-Hop attributes etc., each of which is used as reference information for selecting a path.

FIG. 10 is a diagram illustrating schematically BGP UPDATE messages m1 and m2 with various PATH attributes. In Network Layer Reachablity Information field in FIG. 9, a prefix to be advertised and its prefix length are stored. The prefix and the prefix length correspond respectively to de and le in step S13 of FIG. 7.

The processing of step S12 in FIG. 7 is described in detail. In step S12, an address of an interface, connected to the internal network, of the external connection router Re which is the source of the received path information re, i.e., an address registered as a locator address can be determined, for example, by one of the following methods (1) to (3).

(1) Method Using Next-Hop Attribute

A Next-Hop attribute attached to the BGP UPDATE message is utilized. For example, in the case of the BGP UPDATE message m2 shown in FIG. 10, 172.16.1.254 stored as a Next-Hop attribute is employed as a locator address that corresponds to a destination prefix 192.168.1.0 and prefix length 24.

(2) Method Using an IP Address of Other Party (Counterpart) of TCP Connection in BGP BGP message exchange employs TCP as a layer protocol. In TCP, communication is performed after a connection to a communication partner is established. IP addresses and port numbers at both sides and a protocol number (TCP) are used in order to identify the connection. Since an IP address of the communication partner is determined from information regarding TCP connection, the IP address can be registered as a locator address.

(3) Method of Searching for an IP Address Corresponding to BGP by Referencing to a Prepared Table and Using the Searched IP Address In BGP, when a connection is established, identifiers are exchanged with each other. A correspondence table between the identifier and the locater address is stored in advance in the mapping server Sm. FIG. 11 illustrates details of the correspondence table. With reference to FIG. 11, the correspondence table stores a correspondence between a BGP (BGP ID) identifier and a locator address. For example, locator address is 172.16.5.1 for path information received from an external connection router whose BGP ID is 192.168.1.2.

Furthermore, a combination of the above methods can be used. For example, by referencing a Next-Hop attribute in a BGP UPDATE message and, if a Next-Hop attribute is attached, use the value as a locator address. If a Next-Hop attribute is not attached, use an IP address of the communication partner in the TCP connection as a locator address.

Figure 12:
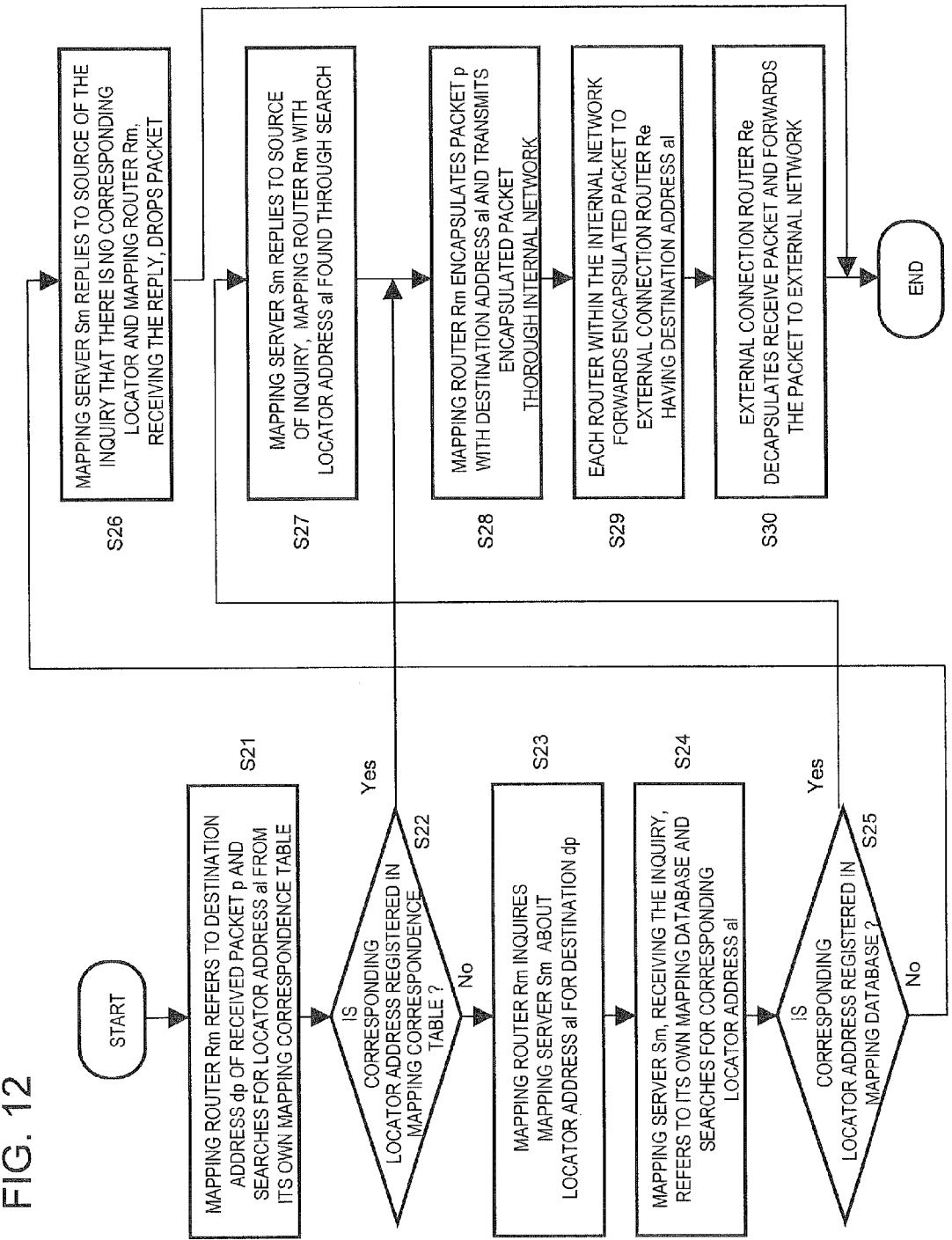
FIG. 12 is a flow chart illustrating a packet forwarding procedure based on a mapping in the first exemplary embodiment.

FIG. 12 is a flow chart illustrating a packet forwarding operation in the present exemplary embodiment.

First, the mapping router Rm refers to the destination address dp of a received packet p. Furthermore, the mapping router Rm searches for a corresponding locator address al from its own mapping correspondence table 142 (step S21).

If a corresponding locator address is registered in the mapping correspondence table 142 (Yes in step S23), go to step S28.

On the contrary, if a locator address is not registered (No in step S22), the mapping router Rm inquires the mapping server Sm about a locator address al for the destination dp (step S23). The mapping server Sm, upon receiving the inquiry, refers to its own mapping database 153, and searches for a corresponding locator address al (step S24).

If the corresponding locator address is not registered in the mapping database 153 (No in step S25), the mapping server Sm replies to the source of the inquiry, the mapping router Rm that there is no corresponding locator address, and the mapping router Rm, upon receiving the reply, drops the packet and terminates the series of processes (step S26).

On the contrary, if the corresponding locator address is registered (Yes in step S25), the mapping server Sm replies to the source of the inquiry, the mapping router Rm having a locator address al found through the search (step S27).

Next, the mapping router Rm encapsulates the packet p, and sets the destination address of the encapsulated packet to the locator address al.

Then, the mapping router Rm transmits the encapsulated packet to the external connection router Re with the destination address al thorough the internal network N (step S28).

Each router within the internal network forwards the encapsulated packet to the external connection router Re (step S29).

The external connection router Re decapsulates the received packet, forwards the packet to the external network (step S30), and terminates the series of processes.

In the present exemplary embodiment, the mapping server Sm stores a mapping information item that relates path information in a path control protocol and an address of an external connection router Re that received the path information. The router refers to the mapping information and encapsulates a packet towards an external address into a packet towards an internal address. According to the present exemplary embodiment, an inter-domain packet forwarding is realized without having each of routers within an AS to store an external path.

Second Exemplary Embodiment

A network system according to a second exemplary embodiment is described with reference to the drawings.

In the process of registering into the mapping database 153 according to the first exemplary embodiment, in a case where there are multiple paths with the same prefix/prefix length, only path information selected as the best path is stored in the mapping database 153. In the present exemplary embodiment, a modification has been done so that each of these multiple paths is used.

FIG. 13 is a diagram illustrating details of a mapping correspondence table 143 in the present exemplary embodiment. With reference to FIG. 13, the mapping correspondence table 143 stores multiple mapping information items, each of which includes an ID, a prefix length, a locator address and a priority value. Compared with the mapping correspondence table 142 according to the first exemplary embodiment shown in FIG. 5, the mapping correspondence table 143 according to the present exemplary embodiment is different from the former in that the latter includes a field for storing a priority value.

In the present exemplary embodiment, when a mapping information item is stored in the process of step S14 of FIG. 7, a priority value is also stored. Referring to an AS-path length in the AS_PATH attribute of a BGP UPDATE message, for example, a value given by dividing 100 by the path length can be used as the priority value. The two BGP UPDATE messages m3 and m4 shown in FIG. 14 have the same prefix and prefix length. The AS-path length of the BGP UPDATE message m3 in FIG. 14 is two, while that of the BGP UPDATE message m4 is four. In this case, the priority values generated from the BGP UPDATE messages m3 and m4 are, respectively, 50 and 25. These are stored as the second and third entries of the mapping correspondence table 143 in FIG. 13.

Figure 15:
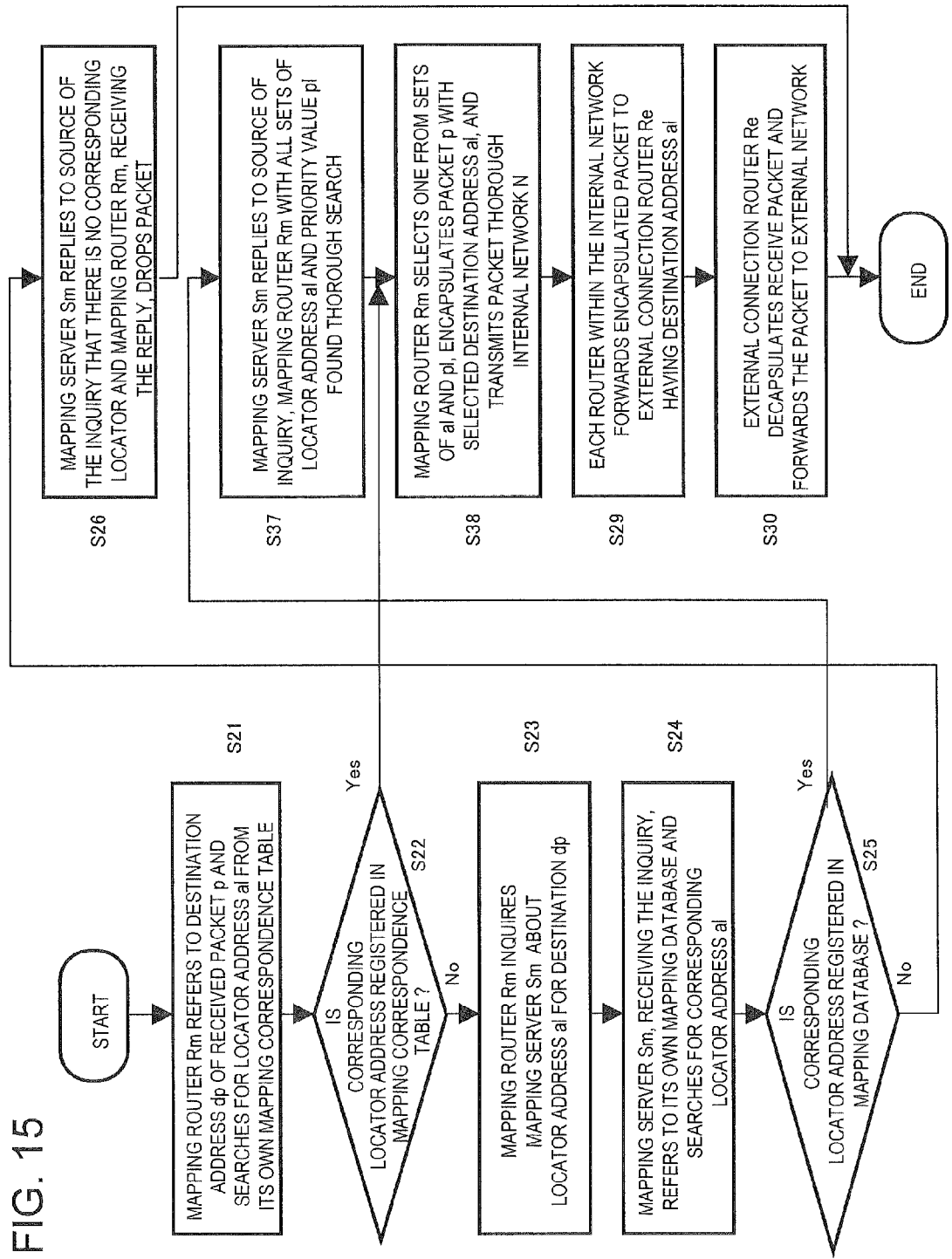
FIG. 15 is a flow chart illustrating a packet forwarding procedure using a mapping in the second exemplary embodiment.
Figure 16:
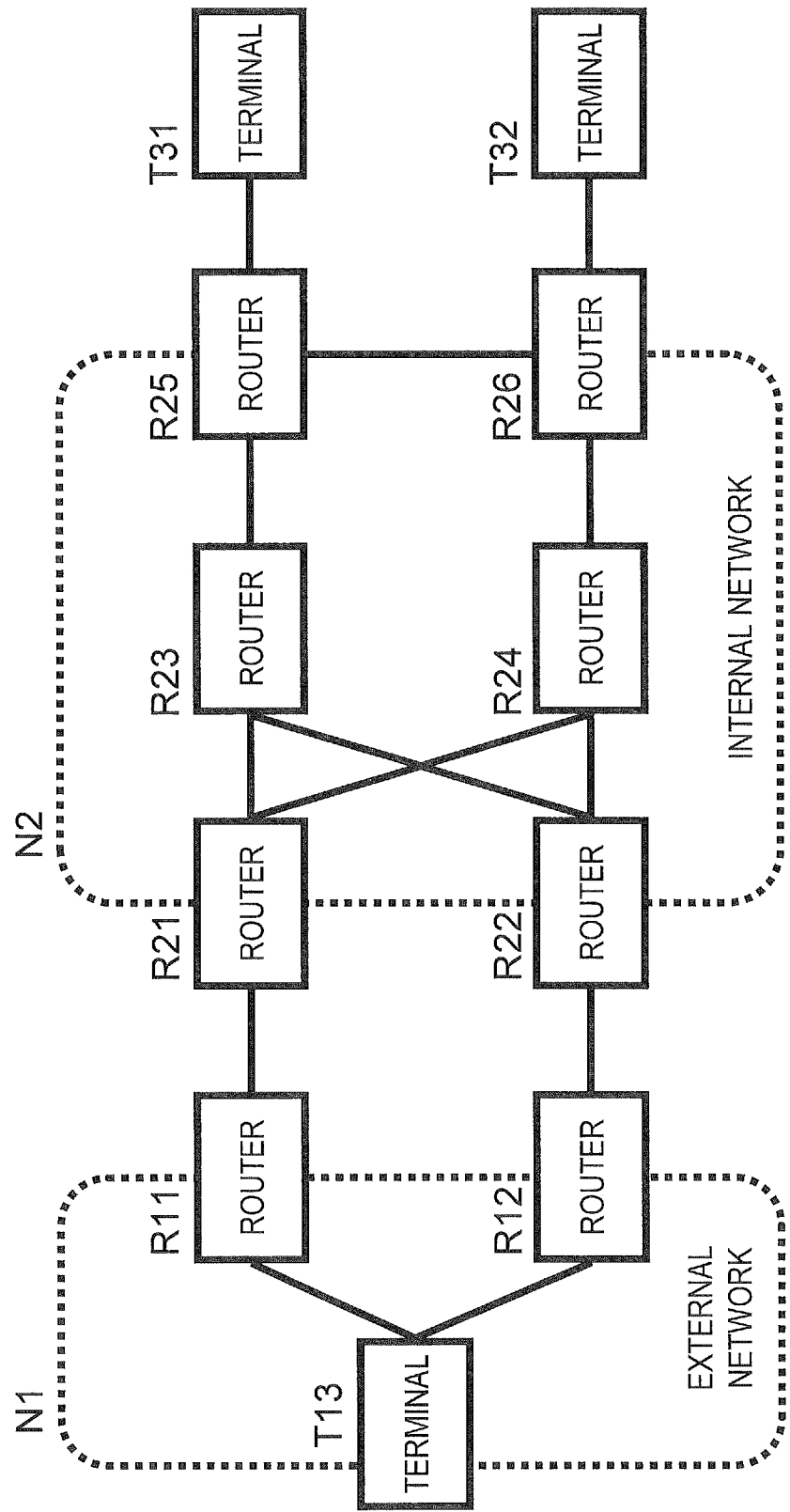
FIG. 16 is a diagram illustrating an internal network connected to an external network.

FIG. 15 is a flow chart illustrating a packet forwarding operation in the present exemplary embodiment. In the present exemplary embodiment, processes in steps S37 and S38 are different from the packet forwarding operation according to the first exemplary embodiment in FIG. 12.

The mapping server Sm replies to the source of the inquiry, the mapping router Rm with all sets of a locator address al and a priority value pl found thorough the search (step S37).

The mapping router Rm selects one set from the sets of al and pl, encapsulates the packet p with the selected destination address al, and transmits the encapsulated packet thorough the internal network N (step S38).

For example, as criteria for selecting a destination address in accordance with its priority value, there are the following methods.

(1) Select a mapping information item with the highest priority value. In a case where prefix/prefix length is 192.168.10.0/24, a mapping information item with a priority value 50 is selected from the mapping correspondence table 143 in FIG. 13 and 172.16.5.1 is used as the locator address.

(2) If there are multiple mapping information items that correspond to the same prefix/prefix length, one of the multiple mapping information items is selected in accordance with their priority values for each packet. In a case where prefix/prefix length is 192.168.10.0/24, locator addresses 172.16.5.1 and 172.16.1.2 in FIG. 13 are selected at a ratio of 2:1 because their priority values are respectively 50 and 25.

(3) Multiple mapping information items are used in a similar manner as in the above case (2), and one of the multiple mapping information items is selected per flow. The term "Flow" means a series of packets with the same values in the following five fields: destination address, destination port, source address, source port and protocol number.

In a case where prefix/prefix length is 192.168.10.0/24, the ratio of the priority values for the two mapping information items are 2:1 in FIG. 13. In this case, after transforming the values in the above five fields in a packet into a value by certain hash function, the value is divided by three, and 172.16.5.1 is selected, if the remainder is zero or one, and 172.16.1.2 is selected if the remainder is two.

Third Exemplary Embodiment

A network system according to a third exemplary embodiment is described with reference to FIG. 17. The present exemplary embodiment differs from the first exemplary embodiment described in FIG. 1 in that there are provides egress OFSs (exit OpenFlow Switches) Oe21, O22, OFSs O23, O24, and ingress OFSs Oi25, Oi25 instead of external connection routers Re21, Re22, routers R23, R24, and mapping servers Rm25, Rm26. Moreover, the present exemplary embodiment differs from the first exemplary embodiment in that there is provided an OpenFlow Controller (OFC) C28. Hereinafter, the egress OFSs Oe21 and Oe22 are collectively called as an egress OFS Oe, and the ingress OFSs Oi25 and Oi26 are collectively called as an ingress OFS Oi.

Details on the OFS (OpenFlow Switch) and the OFC (OpenFlow Controller) are described for example in the Non Patent Literatures 2 and 3, the entire disclosure thereof being incorporated herein by reference thereto. The OFS and OFC are described schematically in the following. The OFS comprises a flow table for packet lookup and forwarding, and a secure channel for communication with the OFC. The OFC communicates with the OFS using an OpenFlow protocol through the secure channel, and controls the flow, for example, at an API level. As an example, when an OFS receives a first packet, the OFS searches the flow table based on the header information of the packet. If it does not match, the OFS forward the packet to the OFC through the secure channel.

The OFC determines a path of the packet based on the destination and source information of the packet and the network topology information managed by the OFC. The OFC performs setting of a flow table on each of the OFSs on the determined path. Since the second and subsequent packets hit an entry in the flow table on the OFS, they are not forwarded to the OFC but directly forwarded to a next OFS determined by the entry in the flow table.

Figure 18:
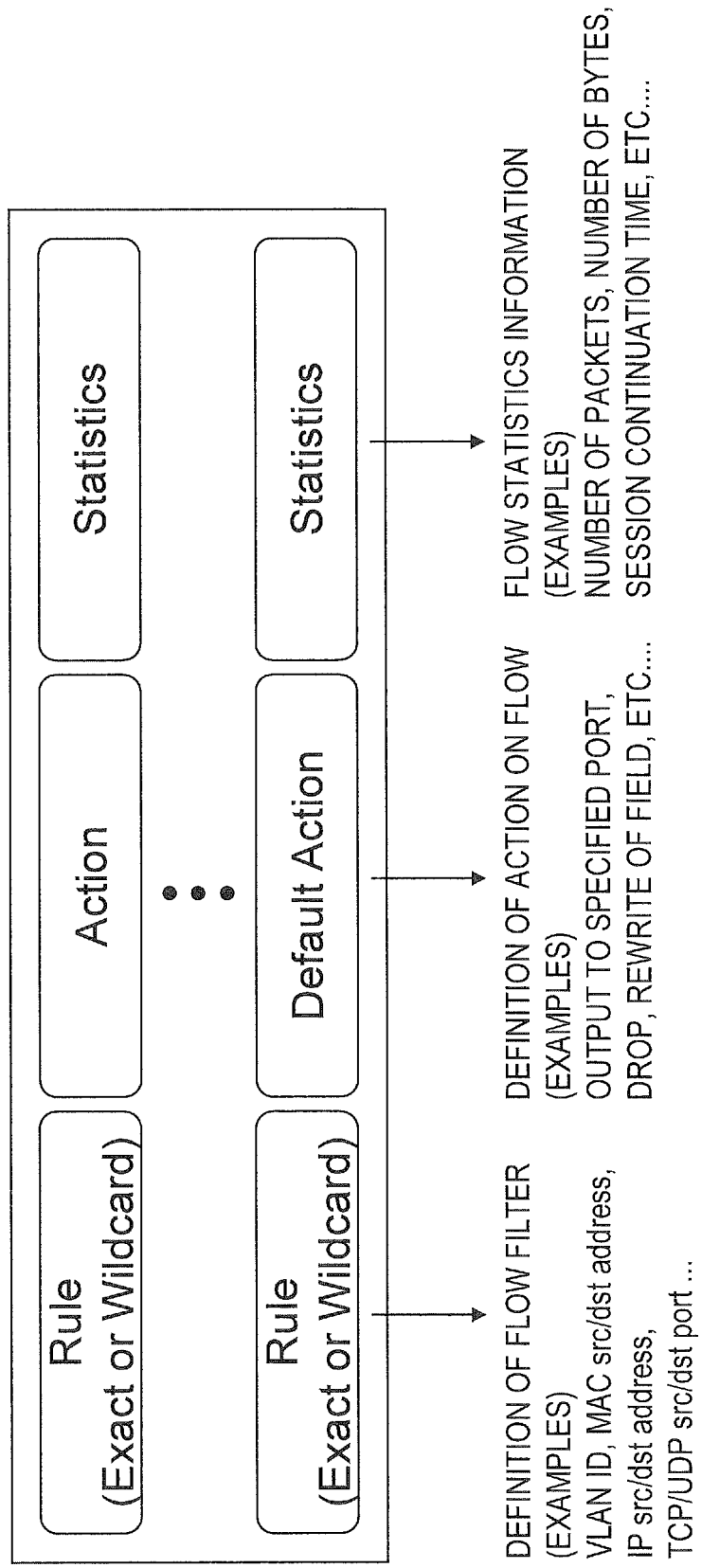
FIG. 18 is a diagram illustrating a flow table in an OpenFlow switch.

For example, as shown in FIG. 18, the flow table on the OFS includes per flow a rule to be matched with a packet header (Rule), an action that defines action on the flow (Action) and flow statistics information (Statistics).

As the Rule to be matched with a packet header, an exact value (Exact) and a wildcard (Wildcard) are used. The Action is an action applied to a packet that matches the Rule. The Flow Statistics Information, also called as "activity counter", includes active entry count, packet lookup count, and packet match count, and for each flow received packet count, received byte count, and active period of the flow, and for each port received packet, transmitted packet, received bytes, transmitted bytes, reception drops, transmission drops, reception errors, transmission errors, received frame alignment error, reception overrun error, reception CRC error, collision count.

A packet received by an OFS is matched with a rule in the flow table. If an entry that matches the packet is found in the rule, the action in the matched entry is performed on the packet. If an entry that matches the packet is not found, the packet is treated as a first packet and forwarded to the OFC thorough the secure channel. The OFC transmits a flow entry, whose packet path is determined, to the OFS. The OFS for its own flow entry adds, changes and deletes a flow entry.

A predetermined field in the header of a packet is used for matching with a rule in the flow table on a switch. Information to be matched includes MACDA (Media Access Control Destination Address), MACSA (MAC Source Address), Ethernet Type (TPID), VLANID (Virtual Local Area Network ID), VLANTYPE (Priority Value), IPSA (IP Source Address), IPDA (IP Destination Address), IP Protocol, Source Port (TCP/UDP Source Port or ICMP (Internet Control Message Protocol) Type), Destination Port (TCP/UDP Destination Port or ICMP Code) (refer to FIG. 19).

FIG. 20 illustrates examples of actions and their contents. OUTPUT is an action for outputting to a specified port (interface). From SET_VLAN_VID to SET_TP_DST are an action for correcting a field of a packet header. The switch forwards the packet to a physical port(s) and the following virtual port(s).

FIG. 21 illustrates examples of virtual ports. IN_PORT is a port for outputting a packet at an input port. NORMAL is a port for processing a packet using an existing forwarding path supported by the switch. FLOOD is a port for forwarding a packet to all ports in a state where communication is possible (in a forwarding state), except a port in which the packet comes. ALL is a port for forwarding a packet to ports except a port in which the packet comes. CONTROLLER is a port for encapsulating a packet and transmitting the encapsulated packet to the controller. LOCAL is a port for transmitting a packet to a local network stack on the switch itself.

A packet that is matched with a flow entry, in which no action is specified, is dropped. Information including a rule, an action, and flow statistics information is called a flow entry. A flow table is a table that stores a flow entry. A schematic operation of the OFS and the OFC is as described above.

A mapping information registration procedure of the present exemplary embodiment based on the OFSs and OFC is described with reference to FIG. 22. At first, the egress (exit) OFS Oe forwards a BGP packet received from a router on an external network to the mapping server Sm27 (step S41). Concrete forwarding process is performed based on the operation of the OFSs and OFC described above.

Figure 17:
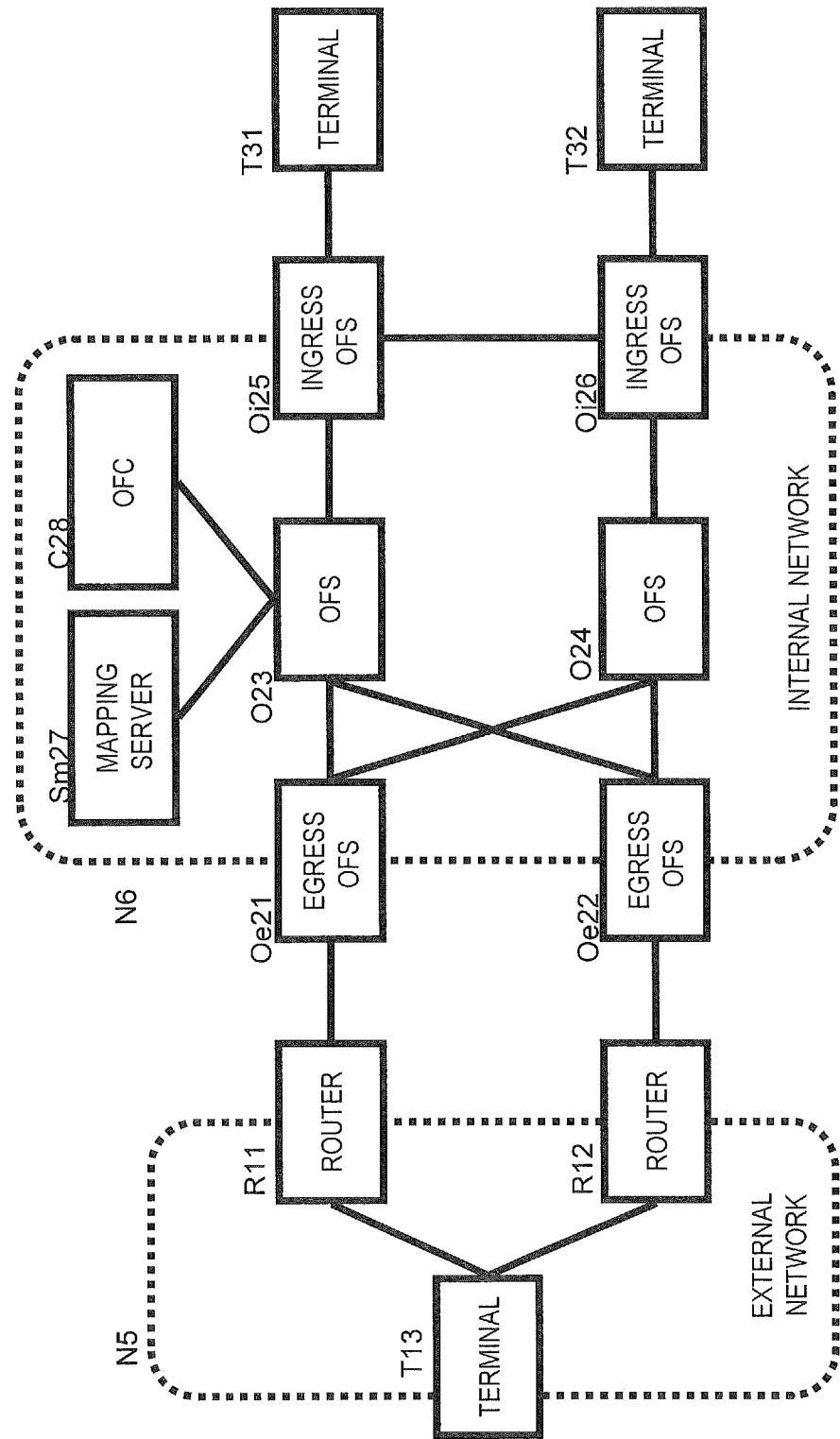
FIG. 17 is a diagram illustrating as an example an internal network in a third exemplary embodiment.

For example, when the egress OFS Oe21 in FIG. 17 firstly receives a BGP packet from the opposing router R11, the egress OFS Oe21 transmits the packet to the OFC C28 through the secure channel. Since the BGP packet is forwarded using TCP, either the source port number or the destination port number is 179. Therefore, the OFC C28 sets the following two flow entries to each of the OFSs along the path from the egress OFS Oe21 to the mapping server Sm27 (egress OFS Oe21 and OFS O23 in FIG. 17). Rules in these flow entries are a rule that TCP source port number is 179 and a rule that TCP destination port number is 179. Further, an action for the egress OFS Oe21 is to output to an interface connected to the OFS O23, and an action for the OFS O23 is to output to an interface connected to the mapping server Sm27. In this way, hereinafter, a BGP packet from the router R11 can reach the mapping server Sm27.

Figure 22:
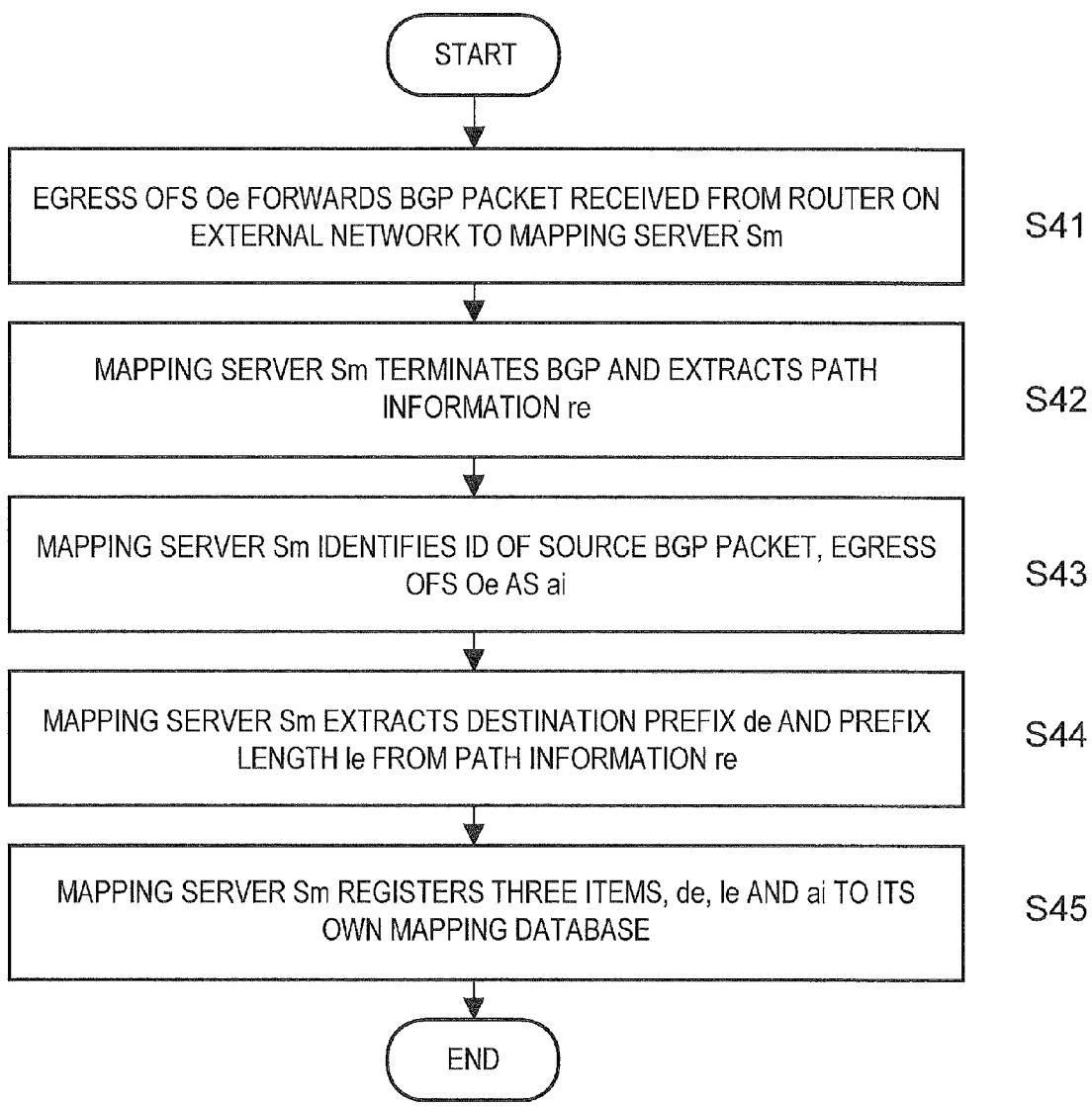
FIG. 22 is a flow chart illustrating a registration procedure of mapping information in the third exemplary embodiment.

Next, in step S42 of FIG. 22, the mapping server Sm terminates the BGP and extracts the path information re. This path information re is equivalent to the information obtained in step S11 of FIG. 7.

Further, the mapping server Sm27 identifies an ID of the source of the BGP packet, the egress OFS Oe21 as an ai (step S453). By referencing the IP source address when terminating the BGP packet, the source of the BGP packet, i.e, a router on an external network can be identified. By storing as an table beforehand correspondence between an IP address of a router on an external network and an ID of an egress OFS Oe connected to the router, and referencing to the table, the step S43 can be realized.

Next, the mapping server Sm27 extracts a destination prefix de and prefix length le from the path information re (step S44).

The mapping server Sm27 registers the a set of three items, de, le and ai to its own mapping database (step S45). In the first exemplary embodiment, ai among the three items registered in the mapping database is an address of an interface, connected to the internal network, of an external connection router. However, in the present exemplary embodiment, ai is an ID of an egress OFS Oe. At this point, the present exemplary embodiment is different from the first exemplary embodiment.

Figure 23:
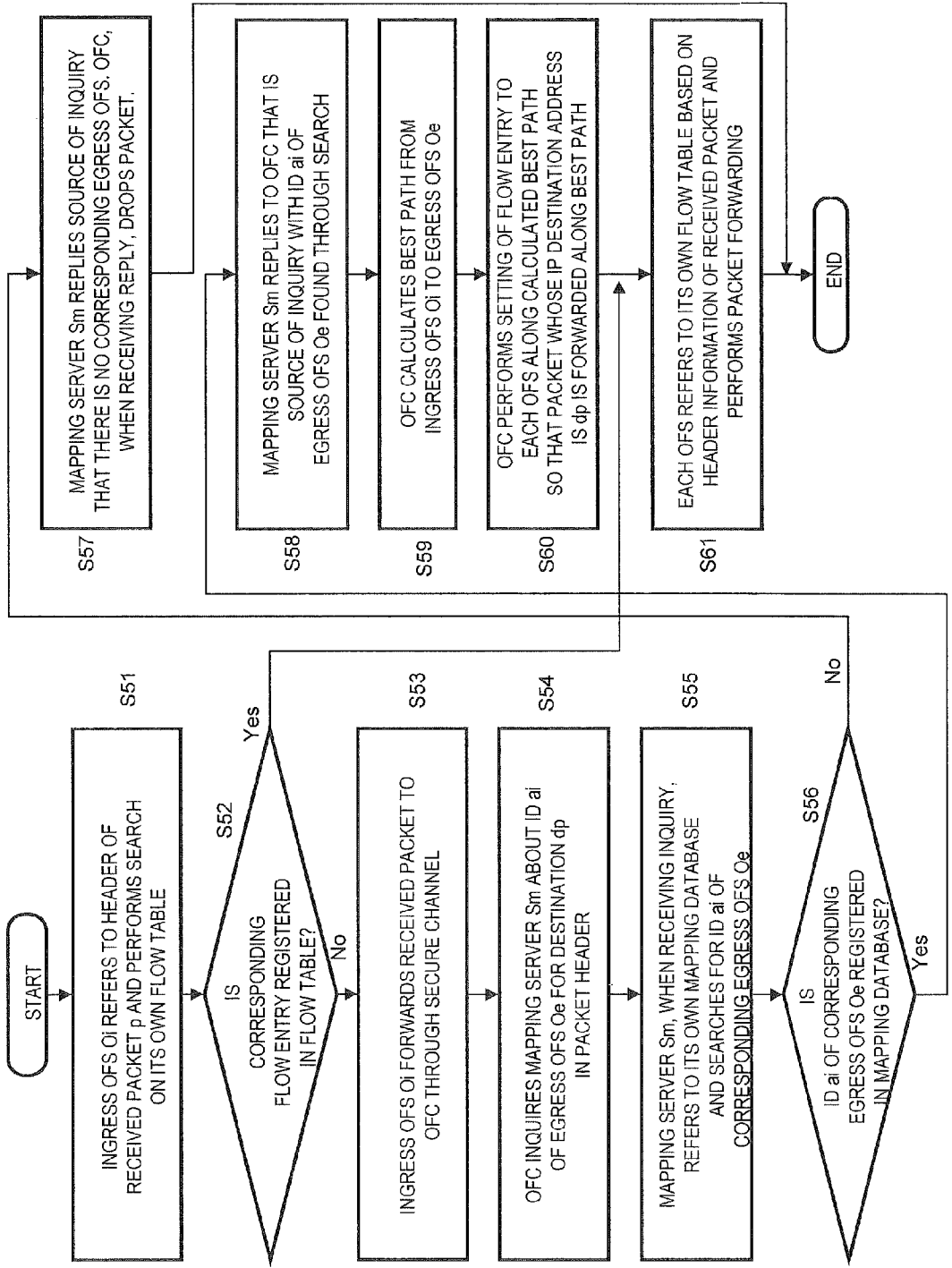
FIG. 23 is a flow chart illustrating a packet forwarding procedure using a mapping in the third exemplary embodiment.

A packet forwarding procedure of present exemplary embodiment based on mapping information generated in the above procedure is described with reference to FIG. 23.

The ingress OFS Oi refers to the header of a received packet p and performs search on its own flow table (step S51).

The ingress OFS Oi determines whether a corresponding flow entry is registered in the flow table or not (step S52). If it is registered (Yes in step S52), go to step S61. If it is not registered (No in step S52), go to step S53.

The ingress OFS Oi forwards the received packet to the OFC C28 through the secure channel (step S53).

The OFC C28 inquires the mapping server Sm27 about an ID ai of an egress OFS Oe for the destination dp in the packet header (step S54).

The mapping server Sm27, when receiving the inquiry, refers to its own mapping database and searches for an ID ai of the corresponding egress OFS Oe (step S55). This search process is an analogous process with the longest prefix match search in the IP route table search.

The mapping server determines whether an ID ai of a corresponding egress OFS Oe is registered in the mapping database or not (step S56). If it is registered (Yes in step S56), go to step S58. If it is not registered (No in step S56), go to step S57.

If there is no corresponding entry in the mapping database (No in step S56), the mapping server Sm27 replies to the source of the inquiry that there is no corresponding egress OFS, the OFC C28, which has received the reply, drops the packet (step S57), and the series of processes is terminated.

On the contrary, if a corresponding entry is found in the mapping database (Yes in step S56), the mapping server Sm27 replies to the source of the inquiry, the OFC C28 with an ID ai of an egress OFS Oe found through the search (step S58).

The OFC C28 calculates the best path from the ingress OFS Oi to the egress OFS Oe (step S59). Since the OFC C28 has topology information (information on connections among all OFS) in the network, the OFC C28 can calculate a shortest path between the two nodes (from Oi to Oe in the present exemplary embodiment) using Dijkstra's algorithm for example and utilize the shortest path as the best path. Various policies can be used regarding a criteria for determining the best path. Any criteria can be used to determine the best path.

The OFC C28 sets the following flow entry to each of the OFS along the path (step S60). As a rule in the flow entry, a packet, whose IP destination address (destination address) is dp, is targeted. As an action, a setting is specified for outputting the packet to an interface connected to the OFS that is the next hop along the best path in order to forward the packet along the calculated best path. To the egress OFS Oe that is the end of the best path, as an action, specify a setting is specified for outputting the packet to an interface connected to a router on an external network.

Each OFS refers to its own flow table based on header information of a received packet and performs packet forwarding (step S61). At this stage, a packet with destination address dp is forwarded from the ingress OFS Oi to the egress OFS Oe along the best path, and the packet is transmitted from the egress OFS Oe towards a router on an external network.

The present invention can be applied, for example, to a network of a service provider that provides access to the Internet.

In the framework of entire disclosure of the present invention (including the claims), and based on its basic technological idea, exemplary embodiments or examples of the present invention may be changed and/or adjusted. Also it should be noted that in the framework of the claims of the present invention, any combinations or selections of various elements disclosed herein are possible. That is, needless to say, it is understood by those skilled in the art that various changes or modifications can be made to the present invention based on the disclosure of the present invention including the claims and the technological idea of the present invention.

Note that disclosure of the previous Japanese domestic application, a basis for claiming the internal priority, is interpreted solely based on the disclosure of the previous domestic application, and that disclosure of the subsequent patent application does not affect the interpretation thereof.

11 route control unit
12 packet forwarding unit
13 tunneling termination unit
14 mapping management unit
15 mapping server unit
16 tunnel processing unit
21-2$n$ network interface
111 path information exchange unit
112 path calculation unit
113 path information transmission unit
121 routing processing unit
122 route table
141 mapping information inquiring unit
142, 143 mapping correspondence table
151 path information obtaining unit
152 mapping information generating unit
153 mapping database
154 mapping information replay unit
m1-m4 BGP UPDATE message
N1, N3 external network
N2, N4 internal network
R11, R12, R21-R26 router
Re, Re21, Re22 external connection router
Rm, Rm25, Rm26 mapping router
Sm mapping server
T13, T31, T32 terminal
C28 OpenFlow controller (OFC)
N5 external network
N6 internal network
O23, O24 OpenFlow switch (OFS)
Oe, Oe21, Oe22 egress OFS
Oi, Oi25, Oi26 ingress OFS
Sm27 mapping server

What is claimed is:

1. A packet forwarding method, comprising:
   obtaining, by a mapping server, path information on an external network through a forwarding device connected to the external network;
   generating, by the mapping server, a mapping information item that relates the path information and identification information of the forwarding device;
   by a control device, searching for identification information of a second forwarding device that corresponds to a destination address of a received packet based on the mapping information item;
   by the control device, calculating a path from a first forwarding device to the second forwarding device;
   by the control device, setting the calculated path to a forwarding device(s) along the calculated path; and
   by the first forwarding device, forwarding along the calculated path a packet having the same destination address as the received packet,
   wherein each of the first and second forwarding devices comprises a flow table, the flow table includes a per flow rule to be matched with a packet header, an action defining action on a flow, and an activity counter including flow statistics information.

2. The packet forwarding method according to claim 1, wherein
   the searching for identification information of a second forwarding device comprises selecting a mapping information item from among a plurality of the mapping information items having a same destination prefix based on a priority value assigned to each of the plurality of mapping information items.

3. The packet forwarding method according to claim 2, wherein the selecting a mapping information comprises selecting a mapping information item in proportion to the priority value assigned to each of the plurality of mapping information items.

4. The packet forwarding method according to claim 2, comprising:
    calculating a hash value using information included in a header of a received packet, wherein
    the selecting a mapping information comprises using the hash value.

5. A network system, comprising a mapping server, wherein
    the mapping server comprises: a path information obtaining unit that obtains path information on an external network through a forwarding device connected to the external network; and
    a mapping information generating unit that generates a mapping information item that relates the path information and identification information of the forwarding device, and
    the network system further comprises: a control device that searches, based on the mapping information item, for identification information of a second forwarding device corresponding to a destination address of a packet received by a first forwarding device, calculates a path from the first forwarding device to the second forwarding device, and sets the calculated path to a forwarding device(s) along the calculated path; and
    a forwarding device that forwards along the calculated path a packet with the same destination address as the received packet,
    wherein each of the first and second forwarding devices comprises a flow table, the flow table includes a per flow rule to be matched with a packet header, an action defining action on a flow, and an activity counter including flow statistics information.

6. The network system according to claim 5, wherein the control device, upon searching identification information of the second forwarding device, selects a mapping information item from among a plurality of the mapping information items with a same destination prefix based on a priority value assigned to each of the plurality of mapping information items.

7. The network system according to claim 6, wherein the control device selects a mapping information item in proportion to the priority value assigned to each of the plurality of mapping information items.

8. The network system according to claim 6, wherein
    the control device calculates a hash value using information included in a received packet, and selects using the hash value a mapping information item from among the plurality of the mapping information items with a same destination prefix.

9. The packet forwarding method according to claim 1, wherein the setting of the calculated path to the forwarding device(s) comprises setting by the control device flow entries to each of the forwarding device(s) along the calculated path from the first forwarding device to the second forwarding device, the control device setting the flow entries such that the packet reaches the mapping server.

10. The packet forwarding method according to claim 1, wherein the setting is specified for outputting the packet to an interface connected to one of the first and second forwarding devices in order to forward the packet along the calculated path.

11. The packet forwarding method according to claim 1, wherein the control device calculates a shortest path from the first forwarding device to the second forwarding device by the calculated path using topology information of a plurality forwarding devices including the first and second forwarding devices.

12. The packet forwarding method according to claim 1, wherein the control device sets a flow entry to each of a plurality of forwarding devices along the calculated path.

13. The packet forwarding method according to claim 1, wherein the control device sets a flow entry to each of a plurality of forwarding devices along the calculated path, including a setting being specified by the control device for outputting the received packet to an interface connected to one of the plurality of forwarding devices that is a next hop along a shortest path to forward the received packet along the calculated path.

14. The packet forwarding method according to claim 1, wherein the flow statistics information includes at least one of the following:
    an active entry count, a packet lookup count, and packet match count, and for each flow received packet count, received byte count, and active period of the flow, and for each port received packet, transmitted packet, received bytes, transmitted bytes, reception drops, transmission drops, reception errors, transmission errors, received frame alignment error, reception overrun error, reception CRC (cyclic redundancy check) error, and collision count.

\* \* \* \* \*